United States Patent [19]

Kamei et al.

[11] Patent Number: 5,276,251
[45] Date of Patent: Jan. 4, 1994

[54] PROCESS FOR TREATING ORGANIC PHOSPHORIC ACIDS

[75] Inventors: Yoshinobu Kamei; Wataru Shirato, both of Ibaraki, Japan

[73] Assignee: Mitsubishi Nuclear Fuel Co., Tokyo, Japan

[21] Appl. No.: 26,204

[22] Filed: Mar. 2, 1993

Related U.S. Application Data

[63] Continuation of Ser. No. 635,208, Dec. 28, 1990, abandoned.

[30] Foreign Application Priority Data

Jan. 17, 1990 [JP] Japan ................................ 2-7892

[51] Int. Cl.⁵ ........................... A62D 3/00; C21F 9/04
[52] U.S. Cl. ................................ 588/220; 588/205; 588/213; 588/221; 588/246; 588/252; 252/632; 423/10; 976/DIG. 384; 976/DIG. 387
[58] Field of Search ................ 423/2, 3, 10; 252/630, 252/631, 632; 976/DIG.; 588/205, 213, 216, 220, 221, 244, 252, 246

[56] References Cited

U.S. PATENT DOCUMENTS

| | | | |
|---|---|---|---|
| 3,483,128 | 12/1969 | Rudi et al. | 976/DIG. 384 |
| 4,039,468 | 8/1977 | Humblet et al. | 252/631 |
| 4,352,332 | 10/1982 | Baston | 976/DIG. 384 |
| 4,950,425 | 8/1990 | Rowbottom et al. | 252/631 |

FOREIGN PATENT DOCUMENTS

| | | | |
|---|---|---|---|
| 63-067595 | 3/1988 | Japan | 423/2 |
| 63-100400 | 5/1988 | Japan | 252/631 |
| 63-262597 | 10/1988 | Japan | 252/631 |
| 1354539 | 5/1974 | United Kingdom . | |

OTHER PUBLICATIONS

Babor; Joseph A. Basic College Chemistry 2nd edition Thomas Y. Crowell Co. New York, N.Y. 1953 pp. 255-257.

*Primary Examiner*—Gary P. Straub
*Attorney, Agent, or Firm*—Oblon, Spivak, McClelland, Maier & Neustadt

[57] ABSTRACT

A process for treating organic phosphates, comprising
(a) mixing a waste organic solvent mainly composed of an organic phosphate with an additive mainly composed of at least one of metal salts of aliphatic carboxylic acids represented by formula:

$$(C_nH_{2n+1}COO)_mM$$

wherein
M is K, Ca or Al, and
m is a positive integer of 1, 2 or 3,
(b) heating the resulting mixture, and
(c) optionally burning the mixture to form stable solid containing phosphor content. The metal salts of aliphatic carboxylic acid are preferably metal salts of acetic acid such as potassium acetate, calcium acetate and aluminum acetate. Typical organic phosphate solvent is tributyl phosphate or a mixed solution of tributyl phosphate and benzene.

8 Claims, No Drawings

PROCESS FOR TREATING ORGANIC PHOSPHORIC ACIDS

This application is a file wrapper continuation of Ser. No. 07/635,208, filed on Dec. 28, 1990, now abandoned.

BACKGROUND OF THE INVENTION

1. Field of the Invention

The present invention relates to a process for treating organic phosphoric acid compounds generated as a waste organic solvent in a uranium refining process or in a reprocessing of nuclear fuel.

2. Description of Prior Art

Organic phosphoric acid compounds such as tributyl phosphate or the like used for extracting uranium or plutonium in refining uranium or reprocessing spent nuclear fuels are mostly stored in the form of liquid as a waste after repeated use for several times. This is mainly because the waste solvent contains radioactive substances or because the organic phosphate solvent contains phosphor on which standard for release is set up and therefore it cannot be released as it is or phosphor produced after burning cannot be released to the atmosphere. However, it is undesirable to store the organic phosphate solvent in the form of liquid because there is a possibility of leakage and the solvent has a poor chemical stability. In order to overcome the disadvantages, some processing methods have been tried. For example, Japanese Patent Publication (Kokai) No. Sho 63-67595 describes a process of solidifying organic phosphates by adding thereto a solidifying agent such as hydrated aluminum chloride or polyaluminum chloride. This process has a problem that the solidifying agent is a chloride and therefore chlorine gas, hydrogen chloride or chlorides are released to the atmosphere in heating step in which solidified products are obtained. The processes disclosed in Japanese Patent Publications Nos. Sho 63-262597 and Sho 63-290998 are processes in which organic phosphoric acids are oxidatively decomposed under wet heat conditions and then solidified by the addition of alkaline earth metal hydroxides. These processes have a problem that wet heat conditions involve high pressures rather than normal pressure, which leads to specialization of apparatus to be used.

SUMMARY OF THE INVENTION

An object of the present invention is to solve the above-described problems involved in the prior art and provide a process for treating waste organic phosphates.

It is another object of the present invention to provide a process for treating waste organic phosphates by adding thereto a compound having a good miscibility with organic phosphate solvents to allow adequate reaction to occur between them so that stable solid phosphate compound can be produced.

As a result of intensive investigation, it has now been found that the above-described objects are achieved by the addition of one or more of metal salts of aliphatic carboxylic acids represented by formula: $(C_nH_{2n+1}COO)_mM$ wherein M is K, Ca or Al and m is a positive integer of 1, 2 or 3, to waste organic phosphate solvents.

Therefore, the present invention provides a process for treating organic phosphates, comprising mixing a waste organic solvent mainly composed of an organic phosphate with an additive mainly composed of at least one of metal salts of aliphatic carboxylic acids represented by formula: $(C_nH_{2n+1}COO)_mM$ wherein M is K, Ca or Al and m is a positive integer of 1, 2 or 3, heating the resulting mixture, and optionally burning the mixture to form stable solid containing phosphor content.

The process of the present invention has the following advantages.

(1) In contrast to the addition of inorganic compounds such as $AlCl_3$ and $CaCl_2$ which causes chlorine or chlorides as a result of heat generation, the present invention adds one or more of metal salts of aliphatic carboxylic acids $((C_nH_{2n+1}COO)_mM$ wherein M is K, Ca or Al and m is a positive integer of 1, 2 or 3) such as organic metal compounds, e.g., $CH_3COOK$, $(CH_3COO)_2Ca$ and $(C_{17}H_{35}COO)_2Ca$ to waste organic phosphate solvents and heat the mixture so that they can be uniformly mixed or dissolved and then heats or burns the mixture to decompose the alkyl components into $CO_2$ and $H_2O$. Therefore, the process of the present invention is harmless.

(2) In the present invention, organic phosphate solvents can be converted into metal phosphates without loss of phosphor content by burning. Therefore, the process of the present invention makes it easy to dispose the by-products.

(3) The process of the present invention can be carried out at normal (atmospheric) pressure in contrast to reaction of tributyl phosphate with LiOH which require a high pressure as high as 100 to 200 kg/cm$^2$.

DETAILED DESCRIPTION OF THE INVENTION

In the process of the present invention, the additive to be reacted with the organic phosphate solvent includes organic metal compounds which have a better miscibility than inorganic compounds, for example, metal salts of aliphatic carboxylates of formula $(C_nH_{2n+1}COO)_mM$ wherein M is potassium (K), calcium (Ca) or aluminum (Al) and m is a positive integer of 1 to 3, such as $CH_3COOK$, $(CH_3COO)_2Ca$ and $(C_{17}H_{35}COO)_2Ca$. The additive and the organic phosphate solvent are heated and uniformly mixed or dissolved. The resulting mixture or solution is further heated or burned to decompose the alkyl component alone and form thermally stable products which are stable up to high temperatures, i.e., $K_3PO_4$ (m.p.=1,340° C.), $Ca_3(PO_4)_2$ (m.p.=1,670° C.) and $AlPO_4$ (m.p.>500° C.).

In the process of the present invention, the metal salts of aliphatic carboxylic acids used as additive are preferably acetates which have small molecular weights because it is sufficient to use only a small amount of the additive in the treatment and the acetate compounds have good miscibility and reactivity with the organic phosphate.

Most important feature of the process of the invention is that when tributyl phosphate is used as the organic phosphate, the additive is reacted with tributyl phosphate at a heating temperature no higher than the boiling point thereof (289° C.) in such a manner the additive can be uniformly mixed with or dissolved in tributyl phosphate without scattering and loss of the phosphor component by evaporation. In other words, once the organic phosphate and the additive form a uniform phase, the phosphor component reacts with the additive completely and a stable solid can be obtained without scattering and loss of the phosphor component by evaporation even when they are heated at a temperature higher than the boiling point of the organic phosphate at which it evaporates readily or burned.

Now, the present invention will be explained concretely by examples and comparative examples. However, it should not be construed that the present invention is limited to the examples.

In the following examples, tributyl phosphate or a mixed liquid of tributyl phosphate and benzene ($C_6H_6$) were used as a waste organic phosphate liquor, and ($C_{17}H_{35}COO)_2Ca$, ($CH_3COO)_2Ca \cdot H_2O$ and $CH_3COOK$ were used as an additive.

EXAMPLE 1

To 9 ml of tributyl phosphate (hereafter, referred to as "TBP") was added 27.715 g of calcium stearate powder and the mixture was heated as shown in Table 1. The temperature of the sample increased gradually, and the calcium stearate in the form of powder began to be liquefied and dissolved in TBP uniformly when the temperature reached 90° C. Further, the resulting solution was heated to a temperature no lower than 180° C. in heating step (1). As a result, white smoke was generated, which indicated decomposition of the organic component. In heating step (2), the solution was further heated to a temperature of no lower than 300° C. This caused generation of volumes of white smoke. Before completion of generation of white smoke, the sample was ignited and burned. Upon completion of the burning, main product was obtained as white solid. The sample thus obtained was further heated at a temperature of 800° C. for 3 hours to give solid product weighing 4.744 g. Theoretical weight of the product was calculated to be 4.720 g based on the weight of the starting material assuming that the reaction product was $Ca_3(PO_4)_2$, and the value found substantially corresponded to the theoretical one. That is, it was confirmed that no loss of the phosphor component in TBP occurred during the steps of heating and burning, which made it possible to treat it as $Ca_3(PO_4)_2$. To make assurance doubly sure, elemental analysis of the resulting solid product was conducted. The value found substantially corresponded to theoretical ones calculated assuming that the product was $Ca_3(PO_4)_2$. This confirmed that the product was $Ca_3(PO_4)_2$.

On the other hand, the sample after the heating and dissolving for uniform liquefaction was immediately burned without subjecting it to the steps of heating (1) and of heating (2). In this case, the weight of the solid product actually found corresponded to theoretical ones. That is, it was confirmed that after the additive was liquefied and dissolved in TBP uniformly, a heating step was no longer necessary which would require much time, and the sample was able to be converted to stable solid phosphor compound without discharging the phosphor component to the atmosphere by immediately conducting burning treatment.

In this example, after the burning, black soot was observed partially on the surface of white product. This was considered to be soot formed as a result of incomplete combustion of the organic component in TBP and the additive, and actually it was confirmed that this was the case because no soot was formed when air was supplied forcibly upon combustion.

EXAMPLE 2

When they are used as an extracting agent, organic phosphates such as TBP are generally used as mixed solutions together with diluents such as benzene, dodecane and kerosene. In this example, a sample was used which was a mixed solution composed of 30% of TBP and 70% of benzene. In the first heating stage benzene evaporated, and the temperature of the liquid began to increase immediately after completion of the evaporation. When it reached 90° C., TBP and the additive were liquefied to form a uniform solution. Thereafter, the results were similar to those of Example 1. As in Example 1, formation of black soot due to incomplete combustion was observed partially on the surface of white product after the burning.

EXAMPLE 3

To 30 ml of a mixed solution composed of 30% of TBP and 70% of benzene was added as an additive 8.040 g of calcium acetate ($CH_3COO)_2Ca \cdot H_2O$, and the mixture was heated. As soon as a stage was reached where evaporation of benzene was completed, TBP and the additive reacted with each other gradually to form white solid. Thereafter, similar test procedures to those in Examples 1 and 2 were repeated, and it was confirmed that $Ca_3(PO_4)_2$ was obtained as a final product. As in Example 1, formation of black soot due to incomplete combustion was observed partially on the surface of white product after the burning.

EXAMPLE 4

To 30 ml of a mixed solution composed of 30% of TBP and 70% of benzene was added as an additive 9.183 g of potassium acetate ($CH_3COOK$), and the resulting mixture was heated. In a stage where evaporation of benzene was completed but the temperature of the mixture still remained at 90° C., the additive was not dissolved in TBP but sedimented in a lower layer. When the mixture was heated to a temperature no lower than 180° C. in heating step (1), the additive was dissolved in TBP to form a uniform solution and at the same time white smoke, which was decomposition gas derived from the organic component, began to be generated. In heating step (2) where the temperature of the system was further increased, the whole solution was converted to white crystalline solid. The resulting solid was combustible, and ignited and allowed to burn. The sample thus obtained was further heated at 800° C. for 3 hours to obtain white crystals weighing 6.706 g. Theoretical weight of the product was calculated to be 6.621 g based on the weight of the starting material assuming that the reaction product was $K_3PO_4$. The value actually found and theoretical value corresponded well to each other. This confirmed that the organic phosphate was able to be fixed as $K_3PO_4$ without loss of the phosphor component in TBP. On the other hand, the sample in a stage where the additive and TBP were mixed uniformly in heating step (1) was immediately burned without subjecting it to the step of heating (2). In this case, the weight of the solid product actually found was 6.682 g which corresponded well to theoretical ones. That is, also in this case it was confirmed that once the additive was dissolved in TBP uniformly, a heating step was no longer necessary which would require much time, the phosphor component in TBP was able to be fixed as $K_3PO_4$ by immediate burning treatment.

COMPARATIVE EXAMPLE

When inorganic compounds such as $AlCl_3$ or $CaCl_2$ were added to TBP, miscibility was poor and chlorine or chlorides were formed as a result of reaction with heating. On the other hand, high pressures (100–200kg/cm²) were necessary in the case of reactions between TBP and LiOH.

As described above, inorganic compounds were much inferior to to the organic metal compounds used in the foregoing examples and unsuitable in the process of the present invention.

TABLE 1

| | | Waste TBP Liquor Stabilization Treatment Test by Addition of Organic Substances | | | |
|---|---|---|---|---|---|
| Operation | Temperature (°C.) | Example 1 | Example 2 | Example 3 | Example 4 |
| Heating + Dissolving | 90 | TBP (9 ml) CS (27.715 g) uniformly liquefied | TBP (9 ml) BZ (9 ml) CS (27.715 g) evaporation of BZ uniformly liquefied | TBP (9 ml) BZ (21 ml) CA (8.040 g) evaporation of BZ white solid | TBP (9 ml) BZ (21 ml) PA (9.183 g) evaporation of BZ sedimentation of PA |
| Heating (1) | >180 | formation of white smoke (decomposition gas of organic component) | same as left | same as left | formation of white smoke uniform dissolution of PA |
| Heating (2) | >300 | formation of thick white smoke (decomposition gas of organic component) | same as left | formation of white smoke (same as left) | formation of white smoke white crystals |
| Burning | | burning (remaining organic component) | same as left | same as left | same as left |
| Heating | 800 × 3 hrs | white product (partially black soot) | same as left | same as left | white crystal (no black portion) |
| Weight of Product (g) | | | | | |
| Experimental | | 4.744 | 4.745 | 4.727 | 6.706 |
| (Without Heating) | | (4.730) | (4.741) | (4.722) | (6.682) |
| Calculated | | 4.720 (as Ca₃(PO₄)₂) | 4.720 (same as left) | 4.718 (same as left) | 6.621 (as K₃PO₄) |
| Elemental Analysis (wt. %) | | | | | |
| Element | | Ca  P  H₂O | Ca  P  H₂O | | |
| Experimental | | 40.5  20.9  0.15 | 39.9  21.4  0.18 | | |
| Calculated (as Ca₃(PO₄)₂) | | 38.8  20.0  — | 38.8  20.0  — | | |

Notes:
TBP (9 ml) corresponded to (C₄H₉O)PO (8.106 g)
CS: (C₁₇H₃₅COO)₂Ca
BZ: C₆H₆
CA: (CH₃COO)₂Ca·H₂O
PA: CH₃COOK

What is claimed is:

1. A process for treating organic phosphates, comprising the steps of:
   (a) forming a uniform mixture of a waste organic solvent, predominantly comprising an organic phosphate, with an additive, predominantly comprising at least one metal salt of an aliphatic carboxylic acid represented by the formula:

$(C_nH_{2n+1}COO)_mM$ wherein M is K, Ca, or Al and m is either 1, 2 or 3; and
   (b) heating the resultant mixture to above 300° C. to form an inorganic phosphate compound.

2. The process of claim 1, wherein said metal salt of an aliphatic carboxylic acid is a metal salt of acetic acid.

3. The process of claim 1, wherein said organic phosphate is tributyl phosphate.

4. The process of claim 1, wherein said waste organic solvent is a solution of tributyl phosphate and benzene and wherein the benzene is removed prior to step (b).

5. A process for treating organic phosphates, comprising the steps of:
   (a) forming a uniform mixture of a waste organic solvent, predominantly comprising an organic phosphate, with an additive, predominantly comprising at least one metal salt of an aliphatic carboxylic acid represented by the formula:

$(C_nH_{2n+1}COO)_mM$ wherein M is K, Ca or Al and m is either 1, 2 or 3; and
   (b) heating the resultant mixture to above 300° C., and
   (c) burning the resultant mixture from (b) to form an inorganic phosphate compound.

6. The process of claim 5, wherein said additive is at least one member of the group consisting of potassium acetate, calcium acetate and aluminum acetate.

7. The process of claim 5, wherein said organic phosphate is tributyl phosphate.

8. The process of claim 5, wherein said waste organic solvent is a solution of tributyl phosphate and benzene and wherein the benzene is removed prior to step (b).

* * * * *